L. HAVERSTICK.
Horse-Hay Forks.
No. 138,249. Patented April 29, 1873.
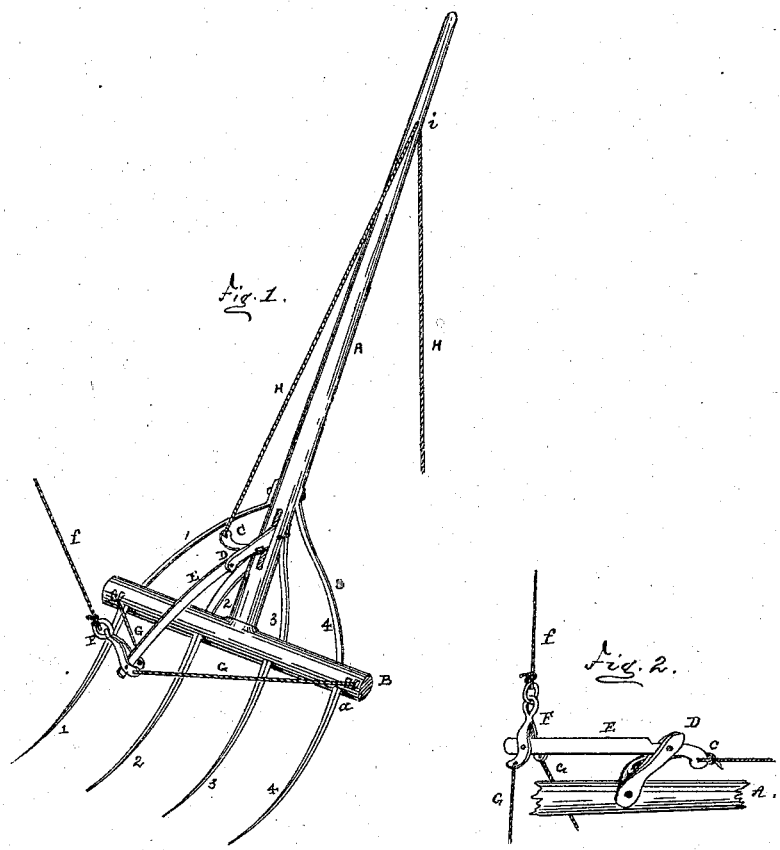
Witnesses.
Inventor.

UNITED STATES PATENT OFFICE.

LEVI HAVERSTICK, OF MANOR TOWNSHIP, LANCASTER COUNTY, PA.

IMPROVEMENT IN HORSE HAY-FORKS.

Specification forming part of Letters Patent No. 138,249, dated April 29, 1873; application filed March 14, 1873.

*To all whom it may concern:*

Be it known that I, LEVI HAVERSTICK, of Manor township, in the county of Lancaster and State of Pennsylvania, have invented certain Improvements in Horse Hay-Forks, of which the following is a specification:

The object of my invention is to make a four-tined fork, so as to be cheaper and more durable, in combination with a handle and tripper. By carrying the separate tines through the ordinary cross-head and bolting the ends to the handle, instead of said cross-head, greater strength and efficiency are had in this kind of forks.

The accompanying drawing illustrates the construction of this hay-fork.

To the handle A there is the ordinary cross-head or piece B, at right angles to the handle; the tines 1, 2, 3, and 4 are carried through the cross piece or head B, and extended and firmly attached to the sides of the handle A, as shown in Figure 1. In the handle, near the said head, there is a slot, in which the jointed lever and tripper are secured by a pivot. The jointed lever is composed of three parts—the attached portion D, arm E, and clevis F—to this latter a ring for a hook or rope, *f*, is affixed to the upper end composed of the two sides, (which embrace the arm E, and between which said arm is held by a pivot-bolt,) the ends below being provided with rings for the brace ropes or chains G G, the other ends of which are attached to staples near the ends of the head B. The tripper *c* has a catch to engage on the edge of the lever-joint D, when drawn forward by the rope H, connected with the tripper and carried forward through a perforation in the handle to the hands of the operator.

The operation is similar to numerous devices in use to the same end. I am not aware that any are arranged in all their parts as herein shown; nor do I specially claim the tripping arrangement, the operation of which is better shown in actual use than understood by simple inspection of the fork alone. This I will explain.

The fork being thrust into the hay, the lever is then pressed down with the foot from its elbowed position, Fig. 2, to that shown in Fig. 1. The weight of the hay on the tines—the brace-cords G, connected with the clevis F on the end of the arm E and with the cross-head B—now holds the load in a hoisting position, in which it is raised to its place of destination by the cord *f*. For discharging the load a pull on the cord H draws the tripper forward and unlocks the lower or elbow joint D of the lever, and causes the loaded fork to tilt and dislodge the hay, and return by its own gravity to a vertical position to repeat the operation.

Experience has proved that, however stout the cross-heads for the tines are made, when the tines are secured by screw and nut or otherwise, the leverage is so great that the wood, however good, will split. This is prevented, and the fork otherwise improved, by carrying the tines through the head and attaching the ends to the sides of the handle, as shown.

I do not claim any of the parts separately considered.

What I claim as my invention, and desire to secure by Letters Patent, is—

1. The combination of the tines 1, 2, 3, and 4, head B, and handle A, when said tines pass through the head and are riveted to the handle, substantially as and for the purpose described.

2. The combination of handle A, tines 1, 2, 3, and 4 passing through cross-head B, brace connections G G, clevis F, jointed lever E D, tripper *c*, and catch and cord connections, arranged and operated in the manner and for the purpose set forth.

LEVI HAVERSTICK.

Witnesses:
WM. B. WILEY,
JACOB STAUFFER.